(12) United States Patent
Brinkhuis et al.

(10) Patent No.: US 7,258,796 B2
(45) Date of Patent: Aug. 21, 2007

(54) USE OF A GRANULATE FOR THE REMOVAL OF LIQUID, GASEOUS AND/OR DISSOLVED CONSTITUENTS FROM A PROCESS STREAM

(76) Inventors: Richard Hendrikus Gerrit Brinkhuis, Groot Wezenland 33, 8011 JX Zwolle (NL); Elwin Schomaker, Driekoningendwarsstraat 22, 6828 EH Arnhem (NL); Johannes Bos, Aubodertreat 22, 7323 LB Apeldoorn (NL)

( * ) Notice: Subject to any disclaimer, the term of this patent is extended or adjusted under 35 U.S.C. 154(b) by 774 days.

(21) Appl. No.: 10/344,544

(22) PCT Filed: Aug. 15, 2001

(86) PCT No.: PCT/EP01/09458

§ 371 (c)(1), (2), (4) Date: Apr. 8, 2003

(87) PCT Pub. No.: WO02/16029

PCT Pub. Date: Feb. 28, 2002

(65) Prior Publication Data

US 2003/0155304 A1    Aug. 21, 2003

(30) Foreign Application Priority Data

Aug. 18, 2000  (NL) .................................. 1015960

(51) Int. Cl.
*B01D 15/00* (2006.01)
*C02F 1/28* (2006.01)

(52) U.S. Cl. ...................................... 210/679; 210/692
(58) Field of Classification Search ................ 210/679, 210/692

See application file for complete search history.

(56) References Cited

U.S. PATENT DOCUMENTS

| 3,960,762 A | | 6/1976 | Kroebel et al. ............. 252/426 |
| 3,989,649 A | * | 11/1976 | Kaiho et al. .................. 521/29 |
| 4,036,794 A | | 7/1977 | Keppler et al. .......... 260/2.5 B |
| 4,711,863 A | | 12/1987 | Streat et al. .................... 502/5 |
| 5,738,791 A | * | 4/1998 | Schomaker et al. ........ 210/638 |

FOREIGN PATENT DOCUMENTS

| EP | 761304 | 3/1997 |
| GB | 2100709 | 1/1983 |

* cited by examiner

*Primary Examiner*—Robert Hopkins
(74) *Attorney, Agent, or Firm*—Coats & Bennett, P.L.L.C.

(57) ABSTRACT

The invention pertains to the use of a granulate for the removal of liquid, gaseous and/or dissolved organic constituents from a process stream, said granulate consisting of dimensionally stable, porous synthetic particles with an extracting agent having a boiling point higher than 350° C. at 1 bar immobilized therein, characterized in that the granulate is obtainable by suspension polymerization of a monovinyl compound in the presence of a polyvinyl compound, with at least 50% wt. % of the monomer units having an aromatic structure and with the solvent for the monomers acting both as a non-solvent for the copolymer and as an extracting agent.

10 Claims, No Drawings

USE OF A GRANULATE FOR THE REMOVAL OF LIQUID, GASEOUS AND/OR DISSOLVED CONSTITUENTS FROM A PROCESS STREAM

This application is a national phase filing of PCT International Application Serial No. PCT/EP 01/09458, filed Aug. 15, 2001, which claims priority from Dutch Patent Application Serial No. 1015960, filed Aug. 18, 2000.

The invention pertains to the use of a granulate for the removal of liquid, gaseous and/or dissolved organic constituents from a process stream, said granulate consisting of dimensionally stable, porous synthetic particles with an extracting agent having a boiling point higher than 350° C. at 1 bar immobilized therein.

The use of a dimensionally stable synthetic granulate for the extraction of liquid, gaseous and/or dissolved constituents from a process stream is known from EP-A-0 761 304. The granulate described in said document is obtained by dissolving a polymer in one or more liquid and miscible compounds at a temperature above the upper critical phase separation temperature Tc, followed by a lowering of the temperature and mechanical diminution of the polymer filled with the liquid compounds. The solvent used in the preparation preferably has the same composition as the extracting agent. The incorporation into the polymer solution of 5 to 60% by volume of filler ensures that the effectiveness of a column filled with particles which have a liquid extraction medium immobilized therein will be as good as retained even after several regenerations with steam. In U.S. Pat. No. 3,960,762 an absorbent has been described based on a synthetic resin that shows some similarity with the resins of the present invention. However, only low boiling extractants have been disclosed that are used as the stationary phase in extraction chromatography for the separation of inorganic molecules. Such systems are unsuitable for separating organic constituents from a process stream, and the extracting agents cannot be regenerated.

A drawback to the use of a filler, preferably in the form of short fibers, is that in the course of processing in an extruder and the subsequent diminution problems due to wear may occur in the equipment used. Another drawback to the granulate prepared in this manner is the comparative inhomogeneity of the material obtained, which may have a negative effect on the flow pattern when it is used in, say, an extraction tower.

The invention now provides for the use of a synthetic granulate which obviates wholly or for the most part the problems which arise when the known granulate is used.

The invention consists in that when a synthetic granulate of the known type mentioned in the opening paragraph is used, the granulate is obtained by suspension polymerization of a monovinyl compound in the presence of a polyvinyl compound, with at least 50 wt. % of the monomer units having an aromatic structure and with the solvent for the monomers acting both as a non-solvent for the copolymer and as an extracting agent. Preferably, the process stream of this process is an aqueous process stream.

Not only can a granulate obtained in this manner be regenerated with, say, steam without any problems, but also, on account of the composition of the monomers used in the suspension polymerization, the effectiveness of an extraction tower filled with said granulate will be much higher than that of a column filled with particles obtained by a process as disclosed in EP-A-0 761 304. This enhanced effectiveness, can be increased further still by the use of a specific preparative process which will give porous polymer beads of uniform dimensions. Examples of said last preparative process are described in U.S. Pat. Nos. 3,922,255, 4,444,961, and 4,579,718.

It should be noted that the preparation of a synthetic granulate of the same type as presently proposed has already been described in Japanese patent publication JP-A-61069-816, with the proviso that in said patent publication the solvent for the monomers is removed on conclusion of the suspension polymerization. The principal application described in said document is as an adsorbent. There is not the least suggestion of the use of an extracting agent as solvent for the monomers in the suspension polymerization, nor of the use of the thus obtained synthetic particles for the removal of liquid, gaseous and/or dissolved constituents from a process stream in a manner analogous to that described in EP-A-0 761 304.

According to the invention, preference is given to the use of a synthetic granulate which can be obtained by suspension polymerization of a mixture of monomers 10 to 80 wt. % of which is made up of one or more monovinyl compounds and 90 to 20 wt. % of which is made up of polyvinyl compounds.

As yet, very favorable results have been obtained using a monomer composition at least 40 wt. % of which is composed of a polyvinyl compound and at most 60 wt. % of which is composed of one or more monovinyl compounds.

Suitable aromatic polyvinyl compounds are divinyl benzene, trivinyl benzene, divinyl toluene, and divinyl xylene, and polyvinyl heterocyclic compounds such as divinyl pyridine.

Preferred polyvinyl compounds are divinyl benzene and trivinyl benzene, while for the monoethylenically unsaturated compounds preference is given to styrene, the o-, m-, and p-methyl styrenes, the o-, m-, and p-ethyl styrenes, ethylvinyl benzene, vinyl naphthalene, and vinyl toluene. Although hydrocarbon monomers are preferred, heterocyclic compounds such as divinyl pyridine are also eligible for use.

Examples of suitable aliphatic ethylenically unsaturated compounds are diacrylates and dimethacrylates, such as ethylene glycol diacrylate, ethylene glycol dimethacrylate, trimethylol propane trimethacrylate, neopentyl glycol dimethacrylate, divinyl ketone, divinyl sulfide, allyl acrylate, diallyl maleate, and diallyl fumarate. Suitable monoethylenically unsaturated monomers are esters of acrylic acid, such as methyl, ethyl, and propyl acrylate, and the corresponding esters of methacrylic acid where the ester group has 1-10 carbon atoms. When a technical or commercial grade of divinyl benzene is used, about 20 to 50% of the divinyl benzene is composed of ethylvinyl benzene, and for the calculation the ethylvinyl benzene must be included in the styrene or another monovinyl monomer. In addition, a minimal quantity of some other monomer such as acrylonitrile may be incorporated into the polymer.

As was indicated above, the polymerization reaction is carried out in the presence of an initiator and a solvent for the monomer mixture and a non-solvent for the reaction product formed.

The polymerization reaction can be carried out in the conventional manner for suspension polymerization in the presence of a radical initiator such as benzoyl peroxide, lauroyl peroxide, t-butyl hydroperoxide or azobisisobutyronitrile. The quantity thereof to be used ranges from 0.1 to 12 wt. %, depending on the desired porosity of the synthetic particles. The polymerization reaction is carried out in the presence of the same solvent which acts both as a non-solvent for the copolymer and as extracting agent. The extracting agent should have a boiling point higher than 350° C. at 1 bar. Extracting agents that are regenerable are preferred. It is advantageous to regenerate the extracting agents by applying steam and regeneration columns. As examples of suitable solvents may be mentioned the same ones as are also used as extracting agents for the use claimed in EP-A-0 761 304. In this connection mention is made of paraffin oil, dibenzyl toluene, and polypropylene glycol ether having a molecular weight of 600 to 1,500. As yet, very favorable results have been achieved using diisodecyl phthalate. Preferably, the extracting agent is hydrolysis resistant. Extracting agent wherein the acid number of the extracting agent shows a change of less than 0.9 mmoles/kg/week according to the modified beverage bottle method ASTM D 2619-95, the modification being that no Cu strips are added or used in procedure steps 7.3, 7.11, and 7.13, and that in step 7.5 the temperature is adjusted to 90° C.±0.5° C. at 5 rpm for 1 week, are preferred.

The polymerization reaction is commonly carried out in the presence of a stabilizer. Examples of suitable stabilizers are a natural gum, starch, gelatin, carboxymethyl cellulose, polystyrene, polyvinyl acetate, polyvinyl alcohol, and polyvinyl pyrrolidone. As yet, optimum results have been achieved with a small quantity of a co-stabilizer being present in addition to the stabilizer, for instance a mixture based on sodium sulfate, sodium phosphate, and calcium chloride.

The invention will be further elucidated with reference to the following examples, which of course are for illustrative purposes only and not to be construed as limitations upon the scope of the invention.

EXAMPLE I

Preparation of cross-linked polystyrene beads filled with an extracting agent. Into a double-walled 2.5 l glass reactor vessel equipped with a stirrer, a coil cooler, and a nitrogen inlet were introduced successively: 1,500 g of distilled water, 6.7 g of $CaCl_2$, 4.2 g of $Na_2SO_4$, 2.4 g of $Na_3PO_4 \cdot 12H_2O$, and 18.75 g of polyvinyl pyrrolidone. After heating to 80° C. there was added, with vigorous stirring (stirring rate 140 rpm), a homogeneous solution of 270 g of diisodecyl phthalate, 90 g of styrene, 90 g of divinyl benzene (technical grade, composed of 80 wt. % of divinyl benzene and 20 wt. % of monovinyl benzene ex Aldrich), and 1.5 g of AIBN (azobisisobutyronitrile), and the whole was stirred for a further 10 hours at 80° C. After cooling the material was passed through a sieve having a mesh width of 2 mm and washed with water. In this way a material with a particle size in the range of 0.5 to 2 mm was obtained. Further screening out gave a fraction having a particle size in the range of 0.85 to 1.18 mm.

EXAMPLE II

The material of Example I having a particle size in the range of 0.85 to 1.18 mm was used to determine the adsorption capacity, which was compared with that of a column filled with a material obtained in accordance with the process described in Example III of EP-A-0 761 304, with the proviso that the trialkyl mellitate in this case was replaced by the same extracting agent (diisodecyl phthalate) as used in the polystyrene beads of Example I.

The adsorption capacity could be determined on the basis of the distribution coefficient of the component to be extracted. This latter value was determined on the basis of a number of shaking tests in which a certain quantity of granules was added to a measured quantity of water with a known quantity of methylene chloride dissolved therein. The mixture of solution and granules was stirred for 24 hours each time, after which the remaining concentration of methylene chloride was again determined. The quantity of methylene chloride absorbed by the granules and the distribution coefficient could be determined from the difference in concentration.

For the well-known polypropylene granules an adsorption capacity of 0.4 mg of methylene chloride per g of granules was calculated, while the adsorption capacity calculated for the now proposed material was 2.0 mg of methylene chloride per g of granules at an equilibrium concentration of 40 ppm of methylene chloride. The distribution coefficient (w/w) was determined analogously. For the well-known polypropylene granules the values amounted to 14, for the granules of Example I they amounted to 68.

Another important parameter determining the effectiveness of a column filled with particles with a liquid extraction medium immobilized therein is the extent to which the continuous medium to be extracted is subject to axial mixing in the column. This last factor is of especial importance in the case of high mass transfer rates. The extent to which there is axial mixing can be related to the number of mixers in series ($N_{mix}$), in which case the column is considered a so-called "cascade of ideal mixers in series." $N_{mix}$ was determined by measuring the so-called residence time distribution. This was done as follows.

A 40 cm long cylindrical glass column with a diameter of 5 cm was filled with 172.5 g of material from Example I. As the column was flushed with water at a rate of flow of 6.6 l water/hour, for 1 second a pulse of 100 μl saturated NaCl-solution was provided, after which conductivity measurements were used to determine the salt concentration in the effluent as a function of time.

The number of ideal mixers in series, $N_{mix}$, was determined by introducing a number of values from the curve obtained by experiment into the following formula:

$$E(t) = N_{mix}^{N_{mix}} \left(\frac{t}{\tau}\right)^{N_{mix}-1} e\left(-N_{mix}\frac{1}{\tau}\right)\frac{1}{(N_{mix}-1)!}$$

wherein $E(t) = C_{effl(t)}/C_{infl(t0)}$, wherein $C_{effl(t)}$ = the concentration of the constituent in the effluent at time t, $C_{infl(t0)}$ = the concentration of the constituent in the influent at time t=0, $N_{mix}$ = number of ideal mixers, τ=average residence time (s), and t=time in (s).

τ is calculated by:

$$\tau = \epsilon_b V_c / \Phi_v \quad (2),$$

wherein $\epsilon_b$ = bed porosity, $V_c$ = column volume ($m^3$), and $\Phi_v$ = rate of flow ($m^3$/s).

Introducing the measured values into the above formulae makes it possible to calculate the value for the number of mixers in series, $N_{mix}$.

For the freshly packed column with the material of Example I the number of mixers in series was calculated to be 400 per m.

In an analogous manner the number of mixers was determined, on the basis of a column filled with 175 g of popypropylene granules filled with the same extracting agent (diisodecyl phthalate) as described in Example III of EP-A-0 761 304, to be 150.

The invention claimed is:

1. A process for the removal of liquid, gaseous and/or dissolved organic constituents from a process stream, comprising the use of a granulate comprising dimensionally stable, cross-linked, porous synthetic particles with an extracting agent having a boiling point higher than 350° C. at 1 bar immobilized therein.

2. The process according to claim 1 wherein the process stream is an aqueous process stream.

3. The process according to claim 1 wherein the extracting agent is regenerable.

4. The process according to claim 1 wherein the acid number of the extracting agent shows a change of less than 0.9 mmoles/kg/week according to the modified beverage bottle method ASTM D 2619-95.

5. The process according to claim 1 or 2 wherein the granulate is obtained by suspension polymerization of a monovinyl compound in the presence of a polyvinyl compound, with at least 50 wt. % of the monomer units having an aromatic structure.

6. The process of claim 1 or 2 wherein a solvent for the monomers is used in the suspension polymerization which acts both as a non-solvent for the resulting copolymer and as an extracting agent.

7. The process of claim 5 wherein 10 to 80 wt. % of the monomer is made up of one or more monovinyl compounds and 90 to 20 wt. % is made up of polyvinyl compounds.

8. The process according to claim 5 wherein the polymerization is carried out in the presence of a stabilizer.

9. The process according to claim 8 wherein the stabilizer is polyvinyl pyrrolidone.

10. The process according to claim 6 wherein the organic solvent is diisodecyl phthalate.

* * * * *